No. 806,402. PATENTED DEC. 5, 1905.
J. DONNELLY.
SUPPORT FOR TREES.
APPLICATION FILED JULY 31, 1905.
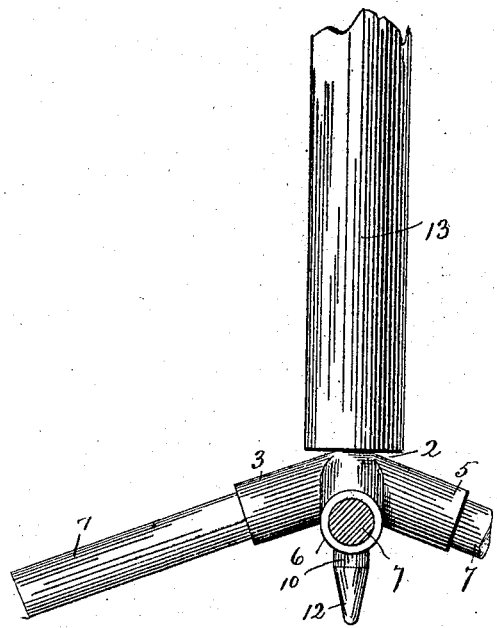
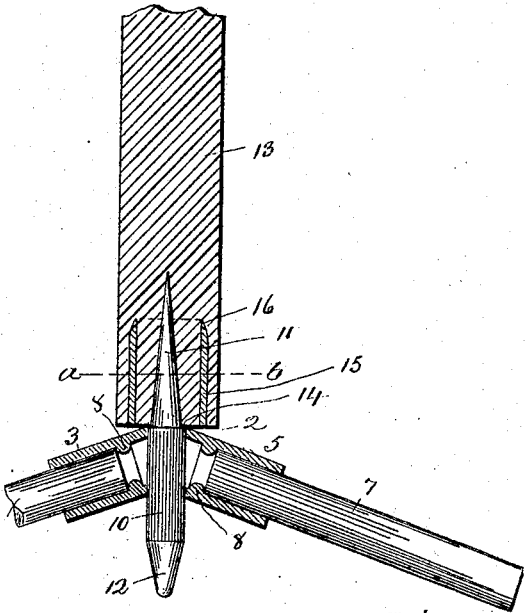
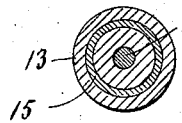
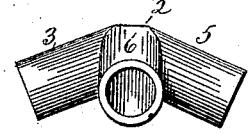
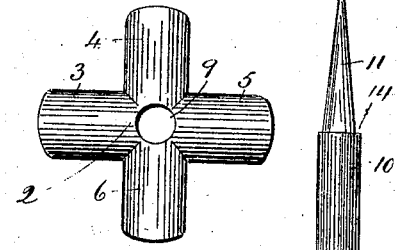
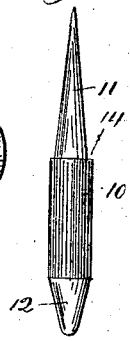
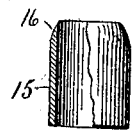

UNITED STATES PATENT OFFICE.

JOHN DONNELLY, OF BRANFORD, CONNECTICUT.

SUPPORT FOR TREES.

No. 806,402.　　　Specification of Letters Patent.　　　Patented Dec. 5, 1905.

Application filed July 31, 1905. Serial No. 272,080.

*To all whom it may concern:*

Be it known that I, JOHN DONNELLY, a citizen of the United States, residing at Branford, in the county of New Haven and State of Connecticut, have invented a new and useful Improvement in Supports for Trees; and I do hereby declare the following, when taken in connection with the accompanying drawings, and the letters of reference marked thereon, to be a full, clear, and exact description of the same, and which said drawings constitute part of this specification, and represent, in—

Figure 1, a broken side view of a tree-support constructed in accordance with my invention; Fig. 2, a transverse vertical section of the same; Fig. 3, a sectional view on the line *a b* of Fig. 2; Fig. 4, a side view, partially in section, of the ring, being inserted into a tree against splitting; Fig. 5, a side view of the body portion detached; Fig. 6, a top or plan view of the same; Fig. 7, a side view of the spike detached.

This invention relates to an improvement in supports for trees, and particularly for holding Christmas trees or boughs for decorative purposes where it is desirable to have a firm support for the tree, the object of the invention being a simple arrangement of parts which may be conveniently stored when not in use; and the invention consists in the construction as hereinafter described, and particularly recited in the claims.

In carrying out my invention I employ a body 2, having four outward and downwardly extending tubular sockets 3, 4, 5, and 6, each adapted to receive a leg 7, of wood or other suitable material, properly shaped to be entered into the sockets. Preferably, and as herein shown, each socket is formed near its inner end with an annular rib 8, which prevents the legs from being driven too far into the sockets. Through the center of the body 2 is a vertically-arranged opening 9, and in connection with this I employ a spike 10, having a long tapering point 11 and a short blunt point 12 at its lower end. This spike is driven into the butt of the tree 13. Preferably, and as herein shown, a shoulder 14 will be formed between the central portion 10 and the tapered point 11, which shoulder will limit the extent to which the spike may be driven into the tree. Preferably, and as also shown in Fig. 3 of the drawings, I employ a ring or collar 15, having a sharpened upper edge 16, which I drive into a tree before driving the spike, so as to prevent splitting the tree by the insertion of the spike. The object of tapering the lower end of the spike is that if there should be slight upsetting of that end by hammering when it is driven into a tree it will not interfere with the passage of the spike through the hole 8 in the body 2. The spike is formed from wrought metal, so that it can be readily bent to true the tree, yet will not break under the weight of the tree. For shipping and storing the legs are removed from the body and conveniently packed with the spike and ring. When required for use, the ring is first driven into the tree, then the spike driven through the center of the ring, and its lower end inserted into the opening in the body 2 after the legs have been placed into position. If the tree does not stand true, a blow with the hammer upon the spike in the proper direction will so bend the spike so as to bring the tree into vertical position. If desired, the spike and ring may be removed for further use; but as they are so inexpensive they may be left in the tree and others may be readily procured to replace them, the body and legs being retained.

Having fully described my invention, what I claim as new, and desire to secure by Letters Patent, is—

1. A tree-support comprising a body and outwardly-extending integral tubular sockets, legs adapted to be entered into said sockets, said body having a centrally-arranged vertical passage, a spike adapted to extend through said passage, said spike formed at its upper end with a tapered point, substantially as described.

2. A tree-support comprising a body and outwardly-extending integral tubular sockets, legs adapted to be entered into said sockets, said body having a centrally-arranged vertical passage, a spike adapted to extend through said passage, said spike formed with a tapered sharp point at one end and a slightly-tapered blunt point at its opposite end, substantially as described.

In testimony whereof I have signed this specification in the presence of two subscribing witnesses.

JOHN DONNELLY.

Witnesses:
　ROBERTA R. BRADLEY,
　WILLIAM R. FOOTE.